US008584444B2

(12) United States Patent
Hoskin

(10) Patent No.: US 8,584,444 B2
(45) Date of Patent: Nov. 19, 2013

(54) MODEL-BASED CONTROLS FOR SELECTIVE CATALYST REDUCTION SYSTEM

(75) Inventor: Robert Frank Hoskin, Duluth, GA (US)

(73) Assignee: General Electric Company, Schenectady, NY (US)

( * ) Notice: Subject to any disclaimer, the term of this patent is extended or adjusted under 35 U.S.C. 154(b) by 484 days.

(21) Appl. No.: 12/702,557

(22) Filed: Feb. 9, 2010

(65) Prior Publication Data

US 2011/0192147 A1    Aug. 11, 2011

(51) Int. Cl.
*F02B 27/04* (2006.01)
*F01N 3/00* (2006.01)

(52) U.S. Cl.
USPC ................................. 60/286; 60/273; 60/276

(58) Field of Classification Search
USPC .................................................. 60/272–324
See application file for complete search history.

(56) References Cited

U.S. PATENT DOCUMENTS

| | | | |
|---|---|---|---|
| 4,473,536 A | | 9/1984 | Carberg et al. |
| 6,295,809 B1 * | | 10/2001 | Hammerle et al. ............. 60/286 |
| 6,427,439 B1 * | | 8/2002 | Xu et al. .......................... 60/286 |
| 6,455,009 B1 * | | 9/2002 | Kato et al. ..................... 422/110 |
| 6,755,014 B2 * | | 6/2004 | Kawai et al. ................... 60/286 |
| 7,093,427 B2 * | | 8/2006 | van Nieuwstadt et al. ..... 60/286 |
| 7,323,036 B2 | | 1/2008 | Boyden et al. |
| 7,559,194 B2 * | | 7/2009 | Westerberg ..................... 60/286 |
| 8,240,194 B2 * | | 8/2012 | Dobson et al. .............. 73/114.75 |
| 2006/0042234 A1 * | | 3/2006 | Song et al. ...................... 60/286 |
| 2008/0250774 A1 * | | 10/2008 | Solbrig ........................... 60/295 |
| 2008/0250778 A1 * | | 10/2008 | Solbrig ........................... 60/301 |
| 2009/0185954 A1 * | | 7/2009 | Qi et al. .......................... 422/62 |
| 2010/0028228 A1 * | | 2/2010 | Gady et al. ................. 423/213.5 |
| 2010/0028230 A1 * | | 2/2010 | Gady et al. ................. 423/239.1 |
| 2010/0050614 A1 * | | 3/2010 | Parmentier et al. ............. 60/287 |
| 2011/0262333 A1 | | 10/2011 | Buzanowski et al. |

OTHER PUBLICATIONS

"Transient Response Method Applied to the Kinetic Analysis of the DeNOx-SCR reaction." Chemical Engineering Science, 56 (2001) p. 1229-1237.

* cited by examiner

*Primary Examiner* — Thomas Denion
*Assistant Examiner* — Anthony Ayala Delgado
(74) *Attorney, Agent, or Firm* — Cooper Legal Group, LLC

(57) ABSTRACT

Systems and methods are provided for controlling ammonia slip downstream of a selective catalyst reduction (SCR) system. The SCR system can include a SCR reactor having a catalyst, inlet, and outlet. The SCR system can also include an injector for injecting a reductant into the SCR reactor at a location upstream from the inlet of the SCR reactor. An estimated value, a reference value, and an error between the two values of ammonia adsorbed on the catalyst surface can be provided. A saturation indication can also be provided to indicate whether the catalyst surface is saturated with the estimated value of adsorbed ammonia. The saturation indication and the error between the estimated and reference values of adsorbed ammonia can be used to adjust a command signal by an open-loop control scheme. The injection of the reductant into the SCR reactor can also be regulated by the command signal.

6 Claims, 4 Drawing Sheets

MODEL-BASED CONTROLS FOR SELECTIVE CATALYST REDUCTION SYSTEM

BACKGROUND OF THE INVENTION

1. Field of the Invention

The present invention relates to methods and systems for controlling ammonia slip, and in particular, for controlling ammonia slip downstream of a selective catalyst reduction (SCR) system.

2. Description of Related Art

Powerplant and engine exhaust systems can include an SCR reactor for removing nitrogen oxides ($NO_x$) from exhaust gases. A reductant, such as ammonia, is injected into the exhaust gas stream entering the SCR reactor to remove $NO_x$ from the exhaust gas. A problem associated with SCR reactors is "ammonia slip," i.e., unreacted ammonia passing through the SCR reactor and exiting the exhaust system with the exhaust gas. It would be desirable to accurately control parameters of the exhaust system, such as the amount of ammonia injected into the exhaust stream, to minimize ammonia slip.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the present invention, provided is a method for controlling ammonia slip downstream of a selective catalyst reduction (SCR) system having a SCR reactor. An estimated value of ammonia adsorbed on a catalyst surface of the SCR reactor is calculated. A saturation indication, which indicates whether the catalyst surface is saturated with the estimated value of adsorbed ammonia, is generated based on the estimated value of ammonia adsorbed on the catalyst surface of the SCR reactor. A reference value of ammonia adsorbed on the catalyst surface of the SCR reactor is provided. An error between the estimated value and the reference value of ammonia adsorbed on the catalyst surface of the SCR reactor is determined. A command signal, which is based on the saturation indication and the error between the estimated value and the reference value of ammonia adsorbed on the catalyst surface, is adjusted using an open-loop control scheme. Injection of a reductant into the SCR reactor is regulated by the adjusted command signal.

In accordance with one aspect of the present invention, provided is a SCR system. The SCR system includes a SCR reactor having a catalyst, an inlet, and an outlet. The SCR system also includes an injector configured to inject a reductant into the SCR reactor at a location upstream from the inlet of the SCR reactor. The SCR system further includes a processor configured to perform an open-loop control for an operation of the injector. An estimated value of ammonia adsorbed on a catalyst surface of the SCR reactor is calculated by the processor. A saturation indication, which indicates whether the catalyst surface is saturated with the estimated value of adsorbed ammonia, is generated by the processor based on the estimated value of ammonia adsorbed on the catalyst surface of the SCR reactor. The processor is also configured to provide a reference value of ammonia adsorbed on the catalyst surface of the SCR reactor, and determine an error between the estimated value and the reference value of the adsorbed ammonia adsorbed on the catalyst surface of the SCR reactor. The processor is further configured to adjust a command signal based on the saturation indication and the error between the estimated value and the reference value of ammonia adsorbed on the catalyst surface; and to regulate the injection of the reductant into the SCR reactor by the adjusted command signal.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Figure 1:
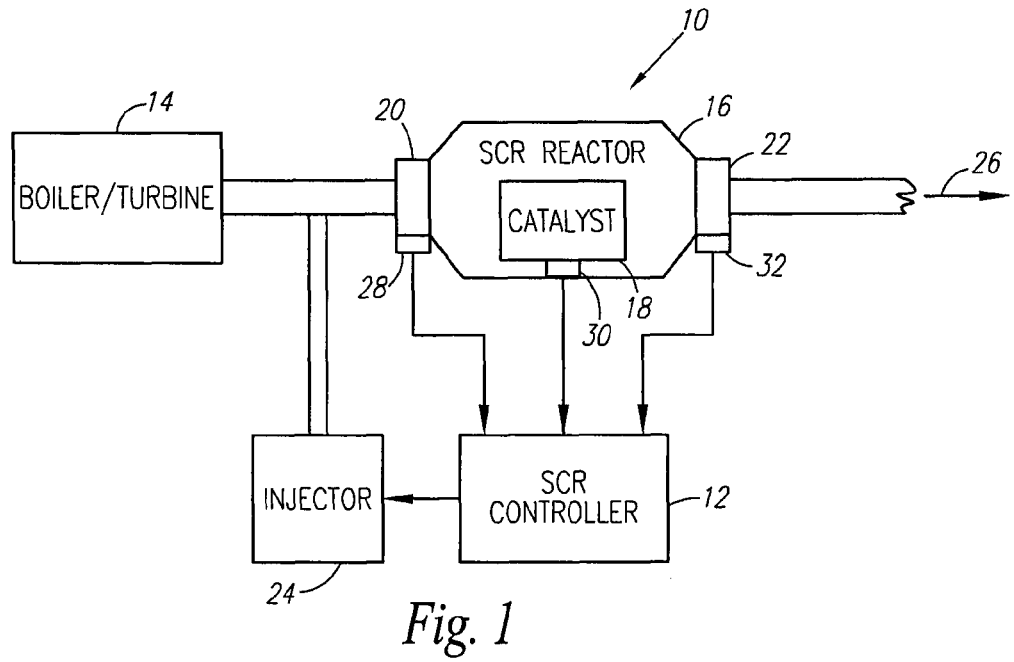
FIG. 1 is a schematic diagram of an example SCR system that includes at least one aspect in accordance with the present invention.

Features and aspects of the present invention will now be described more fully hereinafter with reference to the accompanying drawings in which example embodiments are shown. Whenever possible, the same reference numerals are used throughout the drawings to refer to the same or like parts. However, this invention may be embodied in many different forms and should not be construed as limited to the embodiments set forth herein. These example embodiments are provided so that this disclosure will be both thorough and complete, and will fully convey the scope of the invention to those skilled in the art.

Control methodologies are included in the following description. The control methodologies may reference specific portions, components, inputs or outputs of a controlled system, for purposes of explaining the control methodologies. It may be evident, however, that the control methodologies can be effectively applied to other portions, components, inputs or outputs of the controlled system. The invention is therefore not limited to particular details of this disclosure except to the extent that the claims are necessarily so limited.

Various signals are discussed below. It is to be appreciated that the signals can be analog signals, digital signals or data values stored in a memory location, such as a register. Various circuits and portions of circuits are discussed below. It is to be appreciated that the circuits and portions of circuits can be implemented via discrete electrical components, integrated circuits, and/or through the execution of program instructions by a processor.

FIG. 1 is a schematic diagram of an example SCR system 10. The SCR system 10 carries flue gases having nitrogen oxides ($NO_x$) of a boiler/turbine 14 in a powerplant. The SCR system 10 can be used for utility boilers, industrial boilers, and municipal solid waste boilers with steam turbines. It is to be appreciated that the application of the SCR system 10 is not limited to the boiler with the steam turbine, and can be used for internal combustion engines that produce $NO_x$ in their exhaust gases, such as gas turbines, engines of large ships, diesel locomotives, and automobiles. The SCR system 10 can also be used for a steam and gas turbine combined cycle system known under the General Electric Co. trademark STAG. Nevertheless, the following description refers to a SCR system 10 for a boiler/turbine 14 of a powerplant and controls for the SCR system 10 for ease of explaining example embodiments, but it is understood that other systems may be similarly controlled.

The SCR system 10 can include a SCR reactor 16 having a catalyst 18, an inlet 20, and an outlet 22. The SCR system 10 can further include an injector 24 located upstream from the inlet 20 of the SCR reactor 16 to inject a reductant into the SCR reactor 16 such that the reductant is adsorbed on the surface of the catalyst 18. The flue gases of the powerplant including $NO_x$ from the boiler/turbine 14 flow into the SCR reactor 16 through the inlet 18 and react with the reductant adsorbed on the surface of the catalyst 18, and are converted into nitrogen and water by the aid of the catalyst 18.

Catalyst 18 can be manufactured from carrier and active catalytic components. The carrier can include various ceramic materials, such as titanium oxide. The active catalytic components can include oxides of base metals, vanadium and tungsten, for example. The active catalytic components can also include zeolites, such as iron- and copper-exchanged zeolites. The active catalytic components can further include various precious metals, such as gold, silver, and platinum.

The $NO_x$ reduction reaction takes place as the gases pass through the SCR reactor 16. Before entering the SCR reactor 16, the reductant is injected by the injector 24 and mixed with the flue gases from the boiler/turbine 14. The reductant can include anhydrous ammonia, aqueous ammonia or urea. The reductant can also include cyanuric acid and ammonium sulfate. Nevertheless, the unreacted reductant is released through the outlet 22 of the SCR reactor 16 as ammonia slip 26.

The ideal reaction in the SCR reactor 16 has an optimal temperature range from about 225° C. to about 445° C., preferably, from about 355° C. to about 445° C. Ammonia slip 26 occurs when temperatures of the SCR reactor 16 are not in the optimal range for the reaction or when too much reductant is injected into the SCR reactor 16. Particularly, during the startup or shutdown of the powerplant, the temperature of the SCR reactor 16 may drop below 225° C., for example, at about 100° C. and thus, cause the ammonia slip 26 to be released from the outlet 22 of the SCR reactor 16, which is undesirable for the SCR system 10.

As shown in FIG. 1, the SCR system 10 can include a SCR controller 12. The SCR controller 12 can be operatively coupled to the injector 24 and the SCR reactor 16 to control the operation of the SCR system 10, and in particular, to control the ammonia slip 26 during the startup and shutdown of the powerplant. By regulating the injection of the reductant into the SCR reactor 16 from the injector 24, the SCR controller 12 can control the ammonia slip 26 from the SCR reactor 16. The SCR controller 12 can implement various control schemes to regulate the injector 24, such as a close-loop control scheme, proportional-integral-derivative (PID) control, for example. However, close-loop control requires extensive calibration to obtain desired control performance and thus, increase the complexity and cost of the SCR system 10. Therefore, in one embodiment in accordance with the invention, the SCR controller 12 implements an open-loop control scheme to regulate the injector 24 by the amount of ammonia adsorbed on the surface of the catalyst 18 (theta).

The SCR controller 12 can be an electronic controller and may include a processor. The SCR controller 12 can include one or more of a microprocessor, a microcontroller, a digital signal processor (DSP), an application specific integrated circuit (ASIC), a field-programmable gate array (FPGA), discrete logic circuitry, or the like. The SCR controller 12 can further include memory and may store program instructions that cause the controller to provide the functionality ascribed to it herein. The memory may include one or more volatile, non-volatile, magnetic, optical, or electrical media, such as read-only memory (ROM), random access memory (RAM), electrically-erasable programmable ROM (EEPROM), flash memory, or the like. The SCR controller 12 can further include one or more analog-to-digital (A/D) converters for processing various analog inputs to the controller.

The SCR controller 12 can monitor one or more inputs from one or more sensors located along the SCR system 10. An inlet sensor 28 can be operatively coupled at the inlet 20 of the SCR reactor 16 and obtain the information including the temperature (T), mass flow rate (M), concentration of $NO_x$ ($C_{NOx}$) in the incoming flue gases, and the concentration of ammonia ($C_{NH3}$) upstream from or immediately at the inlet 20 of the SCR reactor 16. Optionally, and alternatively, a catalyst sensor 30 can be operatively coupled to the catalyst 18 in the SCR reactor 16 and obtain the information of the catalyst 18 including the temperature (T), mass flow rate (M), concentration of $NO_x$ ($C_{NOx}$) of the incoming flue gases, and the concentration of injected ammonia ($C_{NH3}$) near or at the catalyst 18 in the SCR reactor 16. An outlet sensor 32 can also be operatively coupled at the outlet 22 of the SCR reactor 16 and obtain the information such as the amount of ammonia slip 26 (SLIP). Sensing of temperature (T), mass flow rate (M), concentration of $NO_x$ ($C_{NOx}$) and ammonia ($C_{NH3}$) in the incoming gases, and amount of ammonia slip 26 (SLIP) can be accomplished using instrumentation known in the art for powerplant controls. The SCR controller 12 can be configured to monitor the conditions at multiple locations along the SCR system 10 via outputs from the inlet sensor 28, catalyst sensor 30, and outlet sensor 32.

Figure 2:
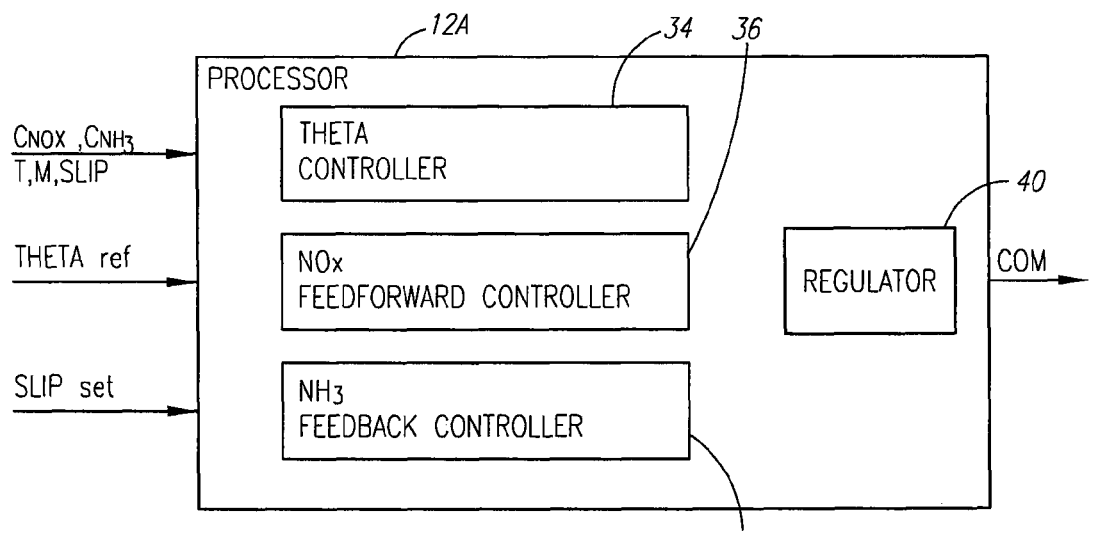
FIG. 2 is a schematic diagram of a processor of a SCR controller of the SCR system of FIG. 1.

Turning to FIGS. 2-6, specifics of one example embodiment of the SCR controller 12 are provided. The SCR controller 12 determines the conditions of the SCR reactor 16 (e.g. T, M, $C_{NOx}$, $C_{NH3}$, SLIP) and predetermined operation conditions such a reference value of theta ($theta_{ref}$) and a set-point of ammonia slip ($SLIP_{set}$) and, therefore, regulates the operation of the injector 24. In FIG. 2, $theta_{ref}$ and $SLIP_{set}$ are schematically shown as inputs to the SCR controller 12. However, it is to be appreciated that $theta_{ref}$ and $SLIP_{set}$ can be generated directly by the SCR controller 12. As shown in FIG. 2, the SCR controller 12 may include a processor 12A for performing various calculations and providing the functionality ascribed herein to the SCR controller 12. The processor 12A can output a command signal (COM) for regulating the operation of the injector 24. The processor 12A can include a theta controller 34, a $NO_x$ feedforward controller 36, a $NH_3$ feedback controller 38, and a regulator 40. The $NO_x$ feedforward controller 36 and $NH_3$ feedback controller 38 are optionally as the theta controller 34 alone can be operatively coupled to the regulator 40 and adjust the command signal (COM). It is also appreciated that the $NO_x$ feedforward controller 36 and $NH_3$ feedback controller 38, alone or in combination, can be coupled to the theta controller 34 and the regulator 40 to generate the command signal (COM).

Figure 3:
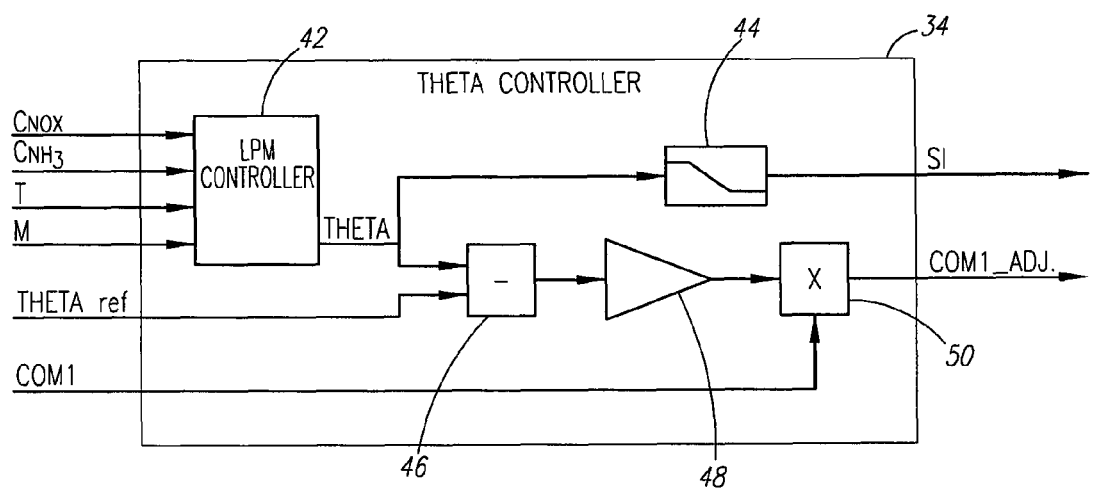
FIG. 3 is a schematic diagram of a theta controller of the SCR controller of the SCR system.

Referring to FIG. 3, a specific example embodiment of the theta controller 34 of the SCR controller 12 is shown in detail. A lumped-parameter kinetic model (LPM) controller 42 is used to calculate theta at different locations along the SCR reactor 16 using a LPM model. Alternatively, any other kinetic model that provides a presentation of $NO_x$ and ammonia concentrations throughout the SCR reactor 16 from the inlet 20 to outlet 22, including theta, can be applied to the theta controller 34. In the embodiment shown in FIG. 3, the LPM controller 42 can calculate the local value of theta at five axial locations along the SCR reactor 16. Lump 1 is the lumped parameter representation from a location nearest the inlet 20 of the SCR reactor 16 representing the location of about 3% of the total reactor axial length from the inlet 20. Lumps 2 through 5 are for locations within the SCR reactor 16 from the location associated with lump 1 to the outlet 22. It is to be appreciated that the specific locations associated with the lumps may be varied in accordance with specific construction/configuration of the SCR reactor 16. The conditions of the SCR reactor 16 monitored and outputted by the inlet sensor 28 and catalyst sensor 30 can be provided to the LPM controller 42 as the inputs of the LPM model. In particular, the conditions from the inlet sensor 28 (T, M, $C_{NOx}$, $C_{NH3}$) are used for calculating theta for lump 1, which provides the preferred indication of the ammonia slip 26. Theta for lump 1 is then sent to a lookup table 44 for generating a saturation indication signal (SI) that indicates whether the catalyst 18 surface is saturated with the adsorbed ammonia. The saturation indication signal (SI) is an output of the theta controller 34, and the value of SI can be in a range between 0 and 1.

Theta for lump 1 is also sent to a subtractor 46 together with another input signal (theta$_{ref}$) which is a predetermined reference value of the ammonia adsorbed on the catalyst 18 surface. An open-loop control scheme is used in the theta controller 34 to adjust the error between theta and theta$_{ref}$ at an amplifier 48. The gain of the amplifier 48 is determined using standard control system design techniques known to those practicing in the art. The output of the amplifier 48 is then sent to a multiplier 50 to adjust a first command signal (COM1) sent from the $NO_x$ feedforward controller 36. The adjusted first command signal (CMO1_ADJ) is another output of the theta controller 34.

Figure 4:
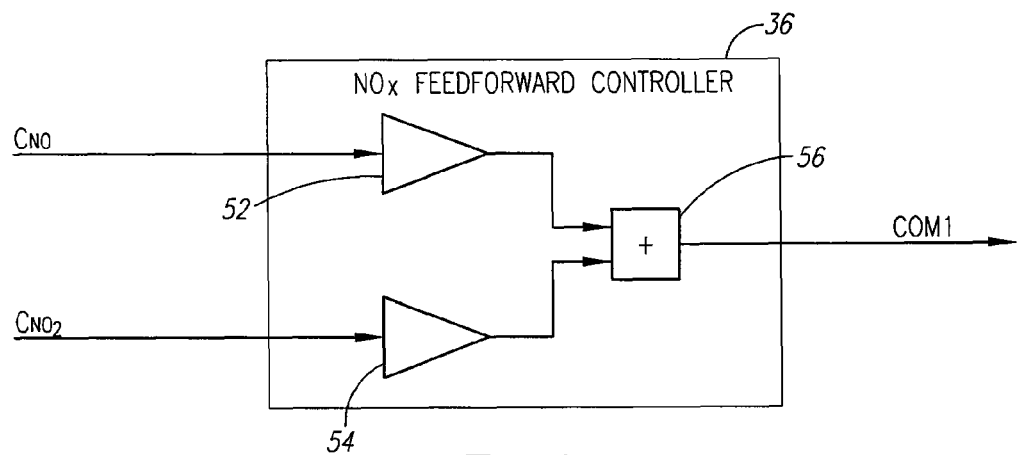
FIG. 4 is a schematic diagram of a $NO_x$ feedforward controller of the SCR controller of the SCR system.

Turning to FIG. 4, a specific example embodiment of the $NO_x$ feedforward controller 36 of the SCR controller 12 is shown in detail. The NO feedforward controller 36 generates a first command signal using a feedforward control scheme based on the concentrations of the $NO_x$ ($C_{NOx}$) monitored at the inlet 20 of the SCR reactor 16. As shown in FIG. 4, the concentration of nitric oxide ($C_{NO}$) and nitrogen dioxides ($C_{NO2}$) can be individually measured by the inlet sensor 28 and input to the $NO_x$ feedforward controller 36. In such a manner, a first amplifier 52 and a second amplifier 54 are used individually to control the gain of the two input signals ($C_{NOx}$, $C_{NO2}$); an adder 56 is then used to couple to results from the individual amplifiers 52, 54 to generate the first command signal (COM1). The gains of the individual amplifiers 52, 54 are determined using standard control system design techniques known to those practicing in the art. In another example, the concentration of the $NO_x$ ($C_{NOx}$) can be directly measured as a single signal and a signal amplifier can be used to generate the corresponding output first command signal. As mentioned above, in an example embodiment of the invention, the first command signal (COM1) outputted from the NO feedforward controller 36 can be sent to the theta controller 34 and multiplied by the output of the amplifier 48 to generate the adjusted first command signal (COM1_ADJ).

Figure 5:
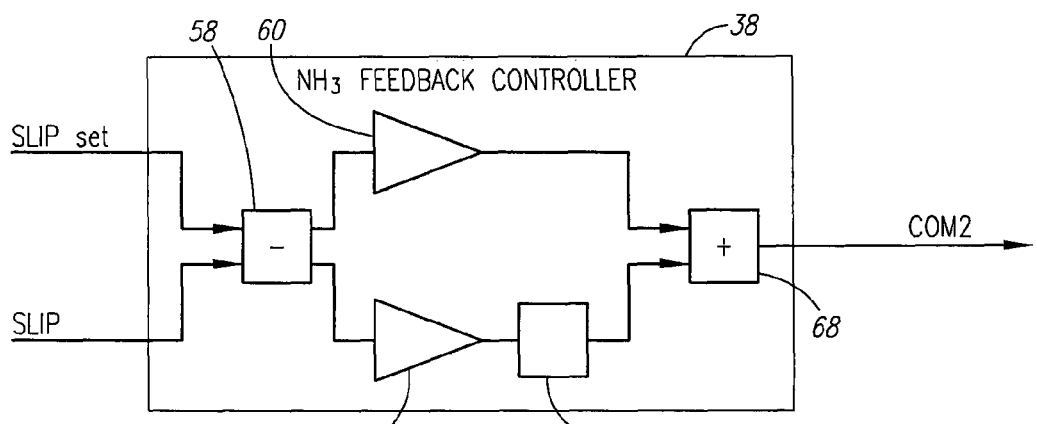
FIG. 5 is a schematic diagram of a $NH_3$ feedback controller of the SCR controller of the SCR system.

Referring to FIG. 5, a specific example embodiment of the $NH_3$ feedback controller 38 of the SCR controller 12 is shown in detail. A subtractor 58 is first used to calculate an error or deviation between of the actual ammonia slip 26 (SLIP) from a predetermined ammonia slip set-point (SLIP$_{set}$). The proportional response of the error value is adjusted by a proportional gain at amplifier 60, while the integral response is adjusted by an integral gain at amplifier 62 and integrated at the integrator 64. The adjusted proportional and integral responses are summed by an adder 68 to calculate the output of the $NH_3$ feedback controller 38. The output of $NH_3$ feedback controller 38 is defined as the second command signal (COM2). Other feedback control schemes such as PID control can also be applied to generate the second command signal (COM2) according to the error or deviation between of the actual ammonia slip 26 (SLIP) from the predetermined ammonia slip set-point (SLIP$_{set}$).

Figure 6:
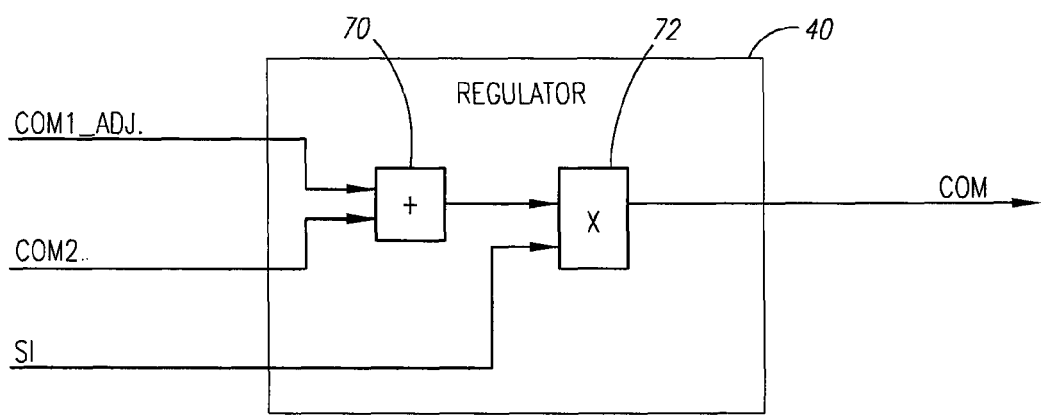
FIG. 6 is a schematic diagram of a regulator of the SCR controller of the SCR system.

Referring to FIG. 6, a specific example embodiment of the regulator 40 of the SCR controller 12 is shown in detail. The adjusted first command signal (COM1_ADJ) from the theta controller 34 is summed with the second command signal (COM2) from the $NH_3$ feedback controller 38 by an adder 70. The output of the adder 70 is then adjusted by multiplying the saturation indication (SI) at a multiplier 72. As mentioned above, the value of the saturation indication (SI) is between 0 and 1; therefore, the adjusted command signal (COM) output from the multiplier 72 becomes 0 if the saturation indication is 0. In this case, the SCR controller 12 outputs the command signal (COM) to temporarily turn off the injector 24 until the saturation indication (SI) goes above 0. In such a manner, ammonia slip 26 (SLIP) is regulated by the SCR controller 12 to avoid undesired ammonia slip spikes exceeding the set-point. In another example, the first command signal (COM1) can be directly sent from the NO feedforward controller 36 to the adder 70 without first being adjusted by the theta controller 34. In still another example, either the first command signal (COM1) or the second command signal (COM2) alone can be directly adjusted by the saturation indication (SI) without first being summed by each other.

Figure 7:
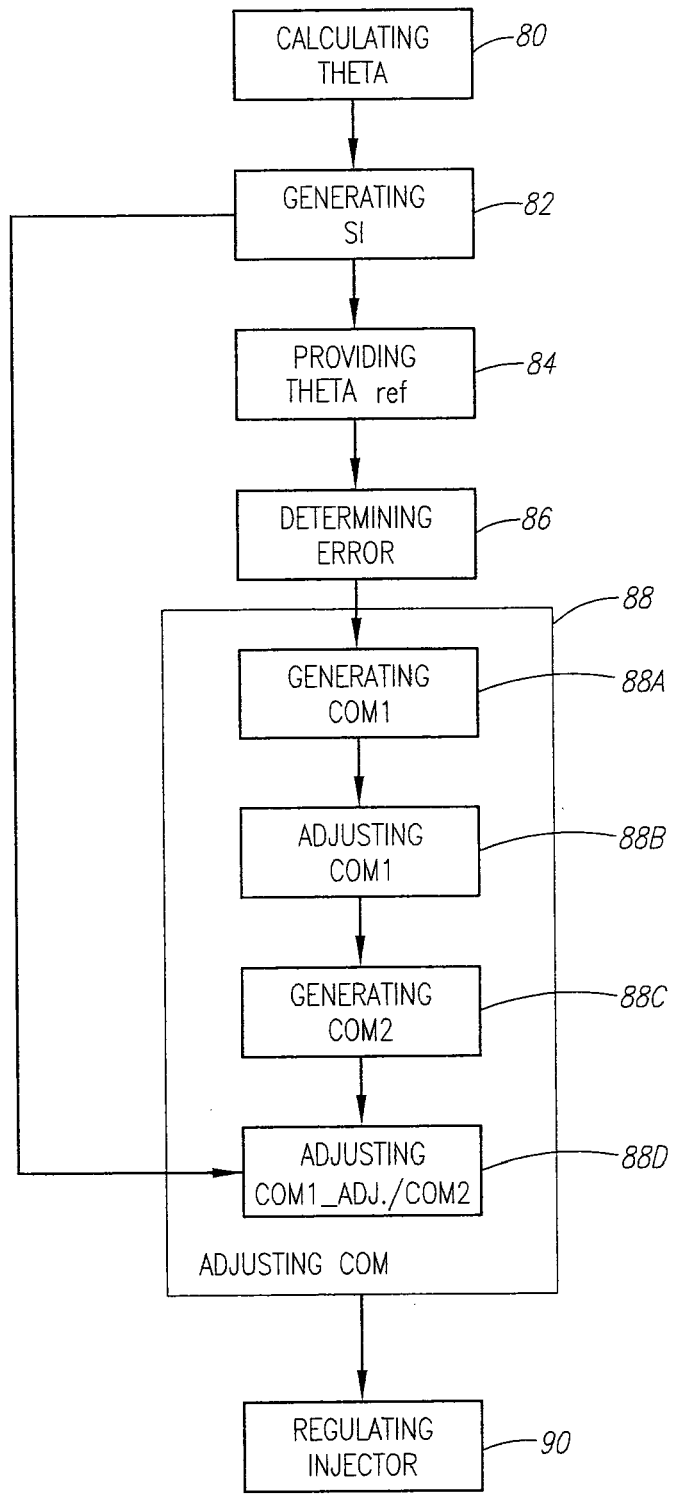
FIG. 7 is a flow chart illustrating steps of a method for controlling ammonia slip downstream of a SCR system in accordance with at least one aspect of the present invention.

Turning to FIG. 7, example methods for controlling ammonia slip downstream of a SCR system in accordance with aspects of the present invention will now be described.

In example embodiments, the methods may include a step 80 of calculating theta. The primary chemical reaction that occurs within the SCR reactor 16 is:

$$NO_x + NH_3 + O_2 \rightarrow N_2 + H_2O \quad (1)$$

By imposing the changes (e.g. step-wise or linear perturbations) of $NO_x$ and ammonia concentration ($C_{NOx}$, $C_{NH3}$), temperature (T), and mass flow rate (M) at the inlet 20, the dynamics of SCR reaction (1) could be understood and mechanistic aspects of the reaction can be clarified. In particular, the adsorption-desorption behavior (e.g. theta) of the reactants can be investigated separately from their surface reaction, thus gaining detailed information on each single step of the reaction.

Theta can be estimated by various SCR models having partial differential kinetic equations. The equations can be solved by ways such as standard finite difference techniques for a spatial discretization, and using the library routine LSODE (Hindmarsh's ordinary differential equations solver) for integration in time. In one example embodiment, a LPM model is used to calculate theta by a lumped-parameter discretization. The estimated theta for lump 1, which is the lumped parameter representation located nearest to the inlet

20 representing about 3% of the total reactor axial length, is determined as a good advance indicator of ammonia slip 26 (SLIP).

In example embodiments, methods can include generating the saturation indication (SI) based on theta at step 82. A lookup table 44 having a theta saturation schedule can be used for example. The value of the saturation indication (SI) is 0 if the theta is larger than a threshold value in the lookup table 44, while the value of the saturation indication (SI) is 1 if theta is smaller than the threshold value. For example, the threshold value is between 0.15 and 0.2. Therefore, for theta input values between 0 and 0.15, the output is 1; for theta input values between 0.15 and 0.2, the output varies linearly from 1 to 0; and for theta input values between 0.2 and 1, the output is 0.

In example embodiments, methods can further include a step 84 of providing a reference value (theta$_{ref}$) of ammonia adsorbed on the catalyst surface of the SCR reactor 16, and a step 86 of determining the error between theta and theta$_{ref}$. Theta$_{ref}$ is predetermined according to various conditions such as the desired range of the ammonia slip 26 (SLIP) and the concentration of the NO$_x$ (C$_{NOx}$) in the flue gases. In one example, theta$_{ref}$ equals to 0.1.

In example embodiments, methods can include a step 88 of adjusting a command signal for regulating the operation of the injector 24 using an open-loop control scheme. In one example, step 88 can include generating a first command signal (COM1) using a feedforward control of NO$_x$ at step 88A; and adjusting the first command signal (COM1) based on the error between theta and theta$_{ref}$ to generate an adjusted first command signal (COM1_ADJ) at step 88B. Step 88 can still further include step 88C of generating a second command signal (COM2) using a feedback control of ammonia slip 26 (SLIP) and step 88D of adjusting the first and/or the second command signal based on the saturation indication (SI) to generate a command signal (COM). In another example, steps 82, 84, 86, 88A, and 88B can be omitted. In such a manner, any command signal for regulating the injector 24 can be adjusted by the saturation indication (SI) at step 88 directly.

As mentioned above, the saturation indication (SI) is between 0 and 1. Accordingly, at step 90, if the catalyst 18 in the SCR reactor 16 is saturated with the ammonia, the saturation indication is 0 and the command signal is also 0 and thus, the injector 24 will temporality be shut-down to stop injecting more ammonia into the SCR reactor 16. In such a manner, the ammonia slip 26 (SLIP) is reduced and undesired ammonia slip spikes are prevented. When theta gradually reduces and is below the threshold value, the saturation indication goes beyond 0. Thus, the injector 24 continues to inject the ammonia into the SCR reactor 16 as the catalyst 18 can adsorb more ammonia. No feedback is required in regulating the command signal (COM) by theta and thus, the complexity and cost of using the method is reduced. The method is particular useful for regulating the ammonia slip during the startup and shutdown operation of a powerplant when the temperature of the SCR reactor 16 is below the optimal temperature for the catalyst 18.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed:

1. A method of controlling ammonia slip downstream of a selective catalyst reduction (SCR) system having a SCR reactor, the method comprising:
   predetermining an ammonia slip set-point downstream of the SCR reactor;
   monitoring to determine an ammonia slip concentration downstream of the SCR reactor;
   calculating to determine an error by subtracting the determined ammonia slip concentration from the ammonia slip set-point;
   generating an error-based command signal utilizing the determined error, wherein a value of the error signal is an additive that adjusts the value of the error-based command signal; and
   regulating the injection of a reductant into the SCR reactor using the error-based command signal to dynamically vary the injection of the reductant so that the ammonia slip setpoint is targeted;
   wherein the step of generating an error-based command signal includes generating a proportional response signal utilizing the determined error, generating an integral response signal utilizing the determined error, and combining at least signals based upon the proportional response signal and integral response signal.

2. The method of claim 1, wherein the step of generating an error-based command signal further includes integrating the integral response prior to the combining of at least signals based upon the proportional response signal and integral response signal.

3. The method of claim 1, including a step of monitoring to determine at least a concentration of at least one of nitric oxide and nitrogen dioxide upstream of the SCR reactor; and wherein the step of generating an error-based command signal includes utilizing the determined at least a concentration of at least one of nitric oxide and nitrogen dioxide.

4. A selective catalyst reduction (SCR) system including:
   a SCR reactor including an inlet and outlet;
   a catalyst in the SCR reactor;
   an injector configured to inject a reductant into the SCR reactor at a location upstream from the inlet of the SCR reactor; and
   an electronic controller configured to perform feed-back control for an operation of the injector in connection with a predetermined ammonia slip set-point downstream of the SCR reactor;
   wherein the electronic controller executes a set of instructions, stored in a memory, for:
   monitoring to determine an ammonia slip concentration downstream of the SCR reactor;
   calculating to determine an error by subtracting the determined ammonia slip concentration from the ammonia slip set-point;
   generating an error-based command signal utilizing the determined error, wherein a value of the error signal is an additive that adjusts the value of the error-based command signal; and
   regulating the injection of a reductant into the SCR reactor using the error-based command signal to dynamically vary the injection of the reductant so that the ammonia slip setpoint is targeted:
   wherein the electronic controller includes a feedback controller that includes a proportional gain amplifier that outputs a proportional response signal utilizing the determined error, an integral response amplifier that outputs an integral response signal utilizing the determined error, and an adder that combines at least signals based upon the proportional response signal and integral response signal.

5. The system of claim 4, wherein the feedback controller includes an integrator that integrates the integral response prior to the combining of at least signals based upon the proportional response signal and integral response signal by the adder.

6. The system of claim 4, further including a monitoring sensor to determine at least a concentration of at least one of nitric oxide and nitrogen dioxide upstream of the SCR reactor; and the electronic controller includes a feedforward controller utilizing the determined at least a concentration of at least one of nitric oxide and nitrogen dioxide and outputting a signal indicative thereof.

\* \* \* \* \*

UNITED STATES PATENT AND TRADEMARK OFFICE
CERTIFICATE OF CORRECTION

PATENT NO. : 8,584,444 B2 Page 1 of 1
APPLICATION NO. : 12/702557
DATED : November 19, 2013
INVENTOR(S) : Robert Frank Hoskin It is certified that error appears in the above-identified patent and that said Letters Patent is hereby corrected as shown below:

In the Specification

Column 5, line 46, please delete "NO" and insert therefor --$NO_x$--.

Column 5, line 65, please delete "NO" and insert therefor --$NO_x$--.

Column 6, line 36, please delete "NO" and insert therefor --$NO_x$--.

Signed and Sealed this
Eighth Day of April, 2014

Michelle K. Lee
*Deputy Director of the United States Patent and Trademark Office*